No. 812,605. PATENTED FEB. 13, 1906.
L. SLAMA.
RUBBER TIRE GUARD.
APPLICATION FILED JULY 6, 1905.
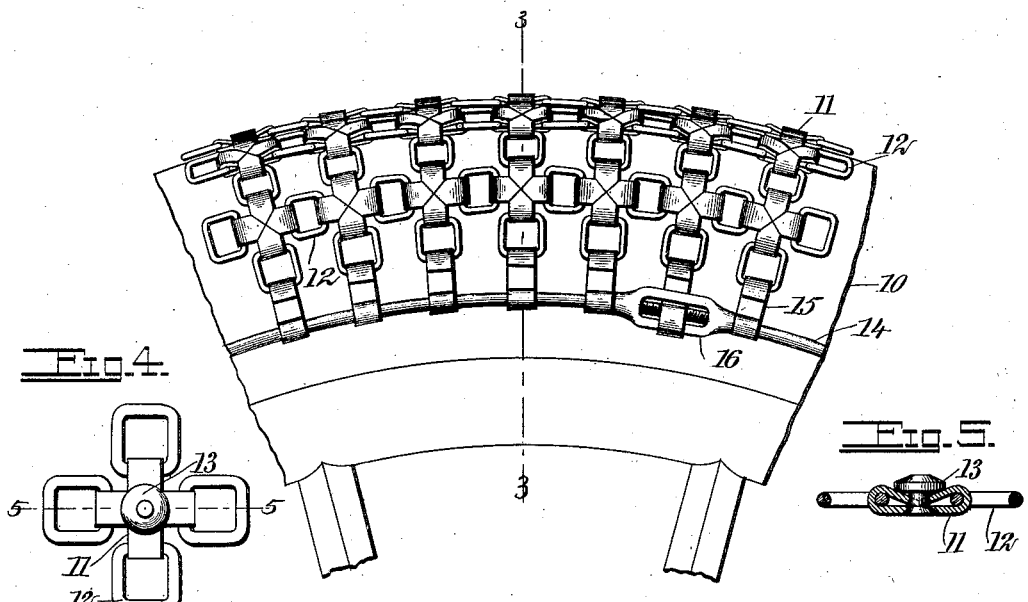
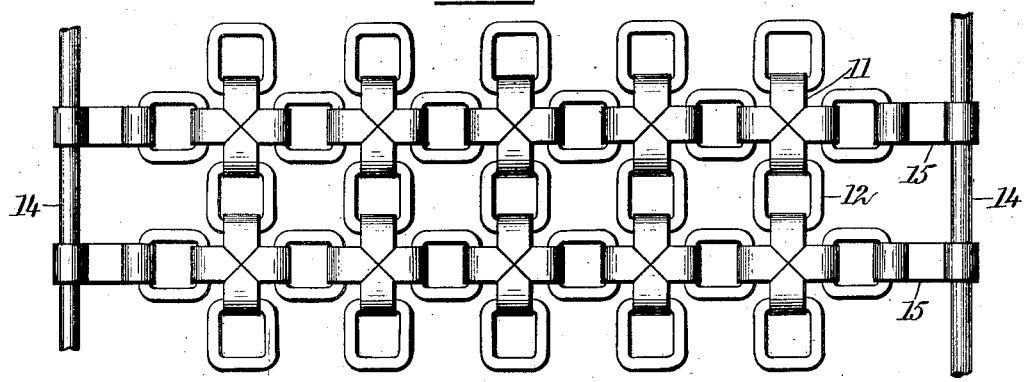
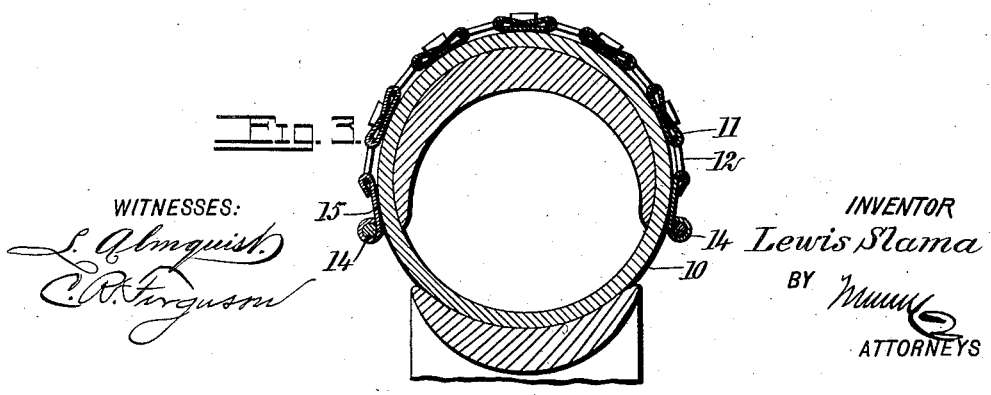
WITNESSES:
L. Almquist
C. R. Ferguson
INVENTOR
Lewis Slama
BY
ATTORNEYS

UNITED STATES PATENT OFFICE.

LEWIS SLAMA, OF HUMBOLDT, NEBRASKA.

RUBBER-TIRE GUARD.

No. 812,605.　　　　Specification of Letters Patent.　　　　Patented Feb. 13, 1906.

Application filed July 6, 1905. Serial No. 268,297.

*To all whom it may concern:*

Be it known that I, LEWIS SLAMA, a citizen of the United States, and a resident of Humboldt, in the county of Richardson and State of Nebraska, have invented a new and Improved Rubber-Tire Guard, of which the following is a full, clear, and exact description.

This invention relates particularly to improvements in guards or protectors for the rubber tires of automobiles, although it may be used on rubber tires of other vehicles, the object being to provide a metal guard that may be readily placed over a tire and absolutely protect the tire from any wear or abrasion, especially from destructive side wear due to running in wagon-wheel ruts.

Other objects of the invention will appear in the general description.

I will describe a rubber-tire guard embodying my invention and then point out the novel features in the appended claims.

Reference is to be had to the accompanying drawings, forming a part of this specification, in which similar reference characters designate corresponding parts in all the views.

Figure 1 is a side elevation of a section of tire with a guard embodying my invention thereon. Fig. 2 is a plan of a portion of the guard. Fig. 3 is a section on the line 3 3 of Fig. 1. Fig. 4 is a detail plan showing a modification as to fastening certain of the links, and Fig. 5 is a section on the line 5 5 of Fig. 4.

Referring to the drawings, 10 designates a pneumatic rubber tire on which a guard is placed, consisting of a network of suitable metal—such, for instance, as sheet-steel—and comprising alternating cruciform and ring-like links. The cruciform links 11 have their arms or projections passed upward through the ring-like links 12 and then turned over upon themselves, as clearly indicated in the drawings. The under sides of the cruciform links are smooth, and therefore will not wear or rub with destructive effect upon the rubber tire. The outer sides of the links project slightly or sufficiently to prevent slipping of the wheel upon the ground, and, if desired, the said links may be strengthened by means of rivets 13, which pass through the body portion of the links and engage with the folded arms, as clearly indicated in Figs. 4 and 5. These rivets will also prevent skidding or sliding. As a means for securing the guard to the tire I have here shown wires 14, which pass through supplemental links 15, and these wires are tightened on the sides of the tire by means of turnbuckles 16.

Instead of wire fastening devices I may employ chains, so that the guard when not in use may be rolled up in a compact form.

A guard made in accordance with my invention will add but very little to the weight of the wheels and the cost will be comparatively slight, and, further, as the links are close together there will be little danger of puncture of the pneumatic tire.

Having thus described my invention, I claim as new and desire to secure by Letters Patent—

1. A rubber-tire guard, comprising a network of alternating cruciform links and ring-like links, and means for securing the guard to a tire.

2. A rubber-tire guard, comprising a network of alternating cruciform links and ring-like links, the arms or members of the cruciform links being extended through the ring-like links and folded upon themselves.

3. A rubber-tire guard, comprising a network of alternating cruciform links and ring-like links, the arms or members of the cruciform links being extended through the ring-like links and folded upon themselves, and rivets extending through the cruciform links and engaging with the folded ends of the arms.

4. A rubber-tire guard, comprising a network of alternating cruciform links and ring-like links, wires for securing the guard to a tire, and tightening devices on said wires.

5. A rubber-tire guard, comprising a network of alternating cruciform links and ring-like links, the arms or members of the cruciform links being extended through the ring-like links and folded upon themselves, supplemental links connected to the side links of the guard, wires extended through said supplemental links, and turnbuckles for tightening said wires.

In testimony whereof I have signed my name to this specification in the presence of two subscribing witnesses.

LEWIS SLAMA.

Witnesses:
　FRANK SNETHEN,
　CARY K. COOPER.